US010127189B2

United States Patent
Feng et al.

(10) Patent No.: US 10,127,189 B2
(45) Date of Patent: Nov. 13, 2018

(54) MULTIDIMENSIONAL STAGE ADAPTIVE TRANSMISSION CONTROL SYSTEM

(71) Applicant: Zhejiang Dafeng Industry Co., Ltd., Yuyao (CN)

(72) Inventors: Qiyun Feng, Yuyao (CN); Zhen Liu, Yuyao (CN); Haihong Tian, Yuyao (CN); Yuejun Yang, Yuyao (CN); Dong Wang, Yuyao (CN); Jianhui Cui, Yuyao (CN); Xianchang Zhao, Yuyao (CN)

(73) Assignee: Zhejiang Dafeng Industry Co., Ltd., Yuyao (CN)

( * ) Notice: Subject to any disclaimer, the term of this patent is extended or adjusted under 35 U.S.C. 154(b) by 147 days.

(21) Appl. No.: 15/208,756

(22) Filed: Jul. 13, 2016

(65) Prior Publication Data
US 2017/0039165 A1    Feb. 9, 2017

(30) Foreign Application Priority Data

Aug. 4, 2015  (CN) .......................... 2015 1 0471272
Aug. 4, 2015  (CN) ...................... 2015 2 0579836 U

(51) Int. Cl.
| G06F 15/167 | (2006.01) |
| G06F 3/06 | (2006.01) |
| G06F 13/28 | (2006.01) |
| H04L 29/08 | (2006.01) |

(52) U.S. Cl.
CPC .......... *G06F 15/167* (2013.01); *G06F 3/0604* (2013.01); *G06F 3/0644* (2013.01); *G06F 3/0653* (2013.01); *G06F 3/0683* (2013.01); *G06F 13/28* (2013.01); *H04L 67/10* (2013.01)

(58) Field of Classification Search
CPC ................................................... H04L 61/6086
See application file for complete search history.

(56) References Cited

U.S. PATENT DOCUMENTS

| 7,236,227 | B2 * | 6/2007 | Whyte | ................... G03B 21/00 |
| | | | | 348/E7.063 |
| 7,424,470 | B2 * | 9/2008 | Pfeifer | .............. G06F 17/30592 |
| 8,395,751 | B2 * | 3/2013 | Redmann | ............... G03B 21/32 |
| | | | | 352/40 |
| 8,483,393 | B2 * | 7/2013 | Robert | ................... H04N 7/163 |
| | | | | 380/200 |

(Continued)

*Primary Examiner* — Jimmy H Tran
(74) *Attorney, Agent, or Firm* — Peter A. Nieves; Sheehan Phinney Bass & Green PA

(57) ABSTRACT

A multidimensional stage adaptive transmission control system includes a local cluster control unit, a direct memory access unit, a plurality of transit storage units, a data type identification unit, an IP address matching unit, a stage equipment data extraction unit, a stage personnel data extraction unit, a stage field data extraction unit and a data volume detection unit. The direct memory access unit includes a buffering relay unit, a finite high-speed storage collection and an interface control sequence unit. The finite high-speed storage collection comprises two sets of configuration registers and a set of state register, the two sets of configuration registers are used to control each data stream communication of the transit storage unit in turn; and the set of state register is used to start the transit storage unit and reflect the transmission state of the transit storage unit.

7 Claims, 4 Drawing Sheets

(56) References Cited

U.S. PATENT DOCUMENTS

| | | | | |
|---|---|---|---|---|
| 9,344,753 B2 * | 5/2016 | Yerli | ................... | A63F 13/06 |
| 9,478,084 B1 * | 10/2016 | Robinson | ............ | G07C 9/00111 |
| 9,486,701 B2 * | 11/2016 | Yerli | ................. | H04N 21/2181 |
| 9,691,205 B2 * | 6/2017 | Robinson | ............ | G07C 9/00309 |
| 2004/0181819 A1 * | 9/2004 | Theiste | .............. | H04N 7/17336 |
| | | | | 725/146 |
| 2005/0256896 A1 * | 11/2005 | Pfeifer | .............. | G06F 17/30592 |
| 2011/0088071 A1 * | 4/2011 | Yerli | ................. | H04N 21/2143 |
| | | | | 725/109 |
| 2011/0159962 A1 * | 6/2011 | Yerli | ................... | A63F 13/06 |
| | | | | 463/39 |
| 2011/0162004 A1 * | 6/2011 | Yerli | ............... | H04N 21/42202 |
| | | | | 725/37 |
| 2011/0162005 A1 * | 6/2011 | Yerli | ............... | H04N 21/42203 |
| | | | | 725/37 |
| 2015/0350712 A1 * | 12/2015 | Sarosi | ............... | H04N 21/2747 |
| | | | | 725/28 |
| 2016/0328898 A1 * | 11/2016 | Robinson | ............ | G07C 9/00111 |
| 2017/0018130 A1 * | 1/2017 | Robinson | ............ | G07C 9/00166 |

* cited by examiner

MULTIDIMENSIONAL STAGE ADAPTIVE TRANSMISSION CONTROL SYSTEM

FIELD OF THE INVENTION

The present invention relates to a stage control field, in particular, to a multidimensional stage adaptive transmission control system.

BACKGROUND

With the increasingly rich stage layout elements in modern performances, the amount of field equipment and number of personnel is growing exponentially, and it is more and more complex to control and manage the equipment and personnel. In order to implement better management or control, it is necessary to obtain more detailed field data, including two aspects: data acquisition and transmission. However, as previously implemented, various subsystems of the stage are separate, difficult to coordinate, and the data collected by all subsystems are independent of each other, having such problems of competition for bandwidth, transmission confusion, difficulty to assess the overall data volume, etc., which results in a low accuracy of stage control and undesirable effect of stage.

SUMMARY

The present invention provides a multidimensional stage adaptive transmission control system, including a local cluster control unit, a direct memory access unit, a plurality of transit storage units, a data type identification unit, an IP address matching unit, a stage equipment data extraction unit, a stage personnel data extraction unit, a stage field data extraction unit and a data volume detection unit.

According to one aspect of the present invention, a multidimensional stage adaptive transmission control system is provided. The multidimensional stage adaptive transmission control system includes a local cluster control unit, a direct memory access unit, a plurality of transit storage units, a data type identification unit, an IP address matching unit, a stage equipment data extraction unit, a stage personnel data extraction unit, a stage field data extraction unit and a data volume detection unit.

The direct memory access unit is used to receive the data transfer instructions from the local cluster control unit, read the storage data from a plurality of transit storage units and upload the data to the cloud central control unit. The data type identification unit identifies the data type of the received data. The IP address matching unit matches the received data with the pre-assigned IPv6 addresses, to identity the exact source of data.

The transit storage unit stores the data submitted by the stage equipment data extraction unit, stage personnel data and stage field data extraction unit according to the data type and matched IPv6 address. The data volume detection unit performs data volume detection on the transmitted data. The stage equipment data extraction unit extracts real-time operating data related to the stage equipment. The stage personnel data extraction unit extracts the real-time execution data relating to stage performers. The stage field data extraction unit extracts the dynamic data relating to the stage field.

In a second aspect, the stage equipment data extraction unit may further include a first sub-control unit, a stage equipment data packing unit, a mechanical component data acquisition sub-unit, an audio and video data acquisition sub-unit and a lighting data acquisition sub-unit. The first sub-control unit receives data acquisition instructions sent from the local cluster control unit, and instructs the mechanical component data acquisition sub-unit, the audio and video data acquisition sub-unit and the lighting data acquisition sub-unit to acquire corresponding data according to the instructions.

The stage equipment data packing unit packs corresponding data acquired from the mechanical component data acquisition sub-unit, audio and video data acquisition sub-unit, and lighting data acquisition sub-unit and transmits the corresponding data to the transit storage unit.

The mechanical component data acquisition sub-unit periodically acquires sensing information of mechanical components connected to the mechanical component data acquisition sub-unit. The sensing information includes three-dimensional coordinates of the stage and an operating state of the mechanical components.

The audio and video data acquisition sub-unit acquires an audio and video play message of the stage in a real-time manner. The lighting data acquisition sub-unit acquires a stage lighting operating information in a real-time manner.

In a third aspect, the mechanical component data acquisition sub-unit specifically may include an angular motion detection unit connected to a vehicle station used for calculating a position and speed of the vehicle station in a real-time manner, and sending the position and speed of the vehicle station to the stage equipment data packing unit as sensing information. A limit sensing unit sends limit alarm information to the stage equipment data packing unit when detecting that the position of the corresponding vehicle station reaches a limit height. A safety rope sensing unit sends rope-release alarm information to the stage equipment data packing unit when detecting that the degree of tightness of the safety rope of the corresponding vehicle station reaches a set threshold value.

The stage equipment data packing unit reports the received limit alarm information or rope-release alarm information to the cloud central control unit through the transit storage unit. The cloud central control unit further stops an operation of the vehicle station after receiving the limit alarm information or the rope-release alarm information.

In a fourth aspect, the audio and video data acquisition sub-unit may include a real-time audio playback parameter acquisition unit, a real-time video playback parameter acquisition unit, an audio and video pre-programmed parameter acquisition unit, and a first parameter comparison unit. The real-time audio playback parameter acquisition unit and the real-time video playback parameter acquisition unit are used for real-time acquisition of audio and video parameters played during a stage performance. The audio and video preprogrammed parameter acquisition unit acquires a relevant video and audio parameters to be played during the performance in advance from the cloud central control unit.

The first parameter comparison unit compares the acquired real-time audio and video parameters with the preprogrammed audio and video parameters acquired in advance. When they are not corresponding, abnormal information of audio and video playing is generated, and the abnormal information and real-time parameters of audio and video playing are reported to the cloud central control unit through the transit storage unit. The cloud central control unit is further used to correct the audio and video playing parameters after receiving the abnormal information and real-time parameters, and sending them to the audio and video playing unit.

In a fifth aspect, the lighting data acquisition sub-unit includes a real-time light parameter acquisition unit, a pre-programmed light parameter acquisition unit, and a second parameter comparison unit. The real-time light parameter acquisition unit acquires real-time light parameters used during the stage performance. The preprogrammed light parameter acquisition unit acquires the relevant light parameters required during the performance in advance from the cloud central control unit. The second parameter comparison unit compares acquired real-time light parameters with the preprogrammed light parameters acquired in advance. When not corresponding, abnormal light information is generated, and the abnormal information and real-time parameters are reported to the cloud central control unit through the transit storage unit. The cloud central control unit is further used for correcting the light parameters after receiving the abnormal information and real-time parameters, and sending them to each stage lighting unit.

In a sixth aspect, the stage personnel data extraction unit includes a second control sub-unit, a stage personnel data packing unit, a high-speed moving image acquisition unit, and a data preprocessing unit. The second control sub-unit receives the data acquisition instruction sent by the local cluster control unit, and instructs the high-speed moving image acquisition unit to acquire corresponding data according to the instruction. The high-speed moving image acquisition unit acquires the body movement state of at least one performer and recording a video. The data preprocessing unit receives the data acquired by the high-speed moving image acquisition unit, extracts at least one key action frame, and recognizes and compares the action sequence. The stage personnel data packing unit packs the corresponding data of the data preprocessing unit and transfers the corresponding data to the transit storage unit.

The multidimensional stage adaptive transmission control system provided herein includes a local cluster control unit, a direct memory access unit, a plurality of transit storage units, a data type identification unit, an IP address matching unit, a stage equipment data extraction unit, a stage personnel data extraction unit, a stage field data extraction unit and a data volume detection unit; the system can acquire and transmit the relevant information of a plurality of stage equipment and personnel dynamically in a real-time manner, thus improving the accuracy of stage control, achieving the control of data traffic, reducing the potential hazards of the stage and enhancing the stage effect.

DETAILED DESCRIPTION

Exemplary embodiments of the present invention are described in detail in combination with drawings, but the patent application is not limited to these embodiments. Any alternatives, modifications, equivalents methods and schemes made within the essence and scope of the patent application shall fall within the scope of protection herein. In order to enable the public to have a thorough understanding of the patent application, specific details are described in the embodiments herein, but those skilled in the art can fully understand the patent application without the description about these details.

Figure 1:
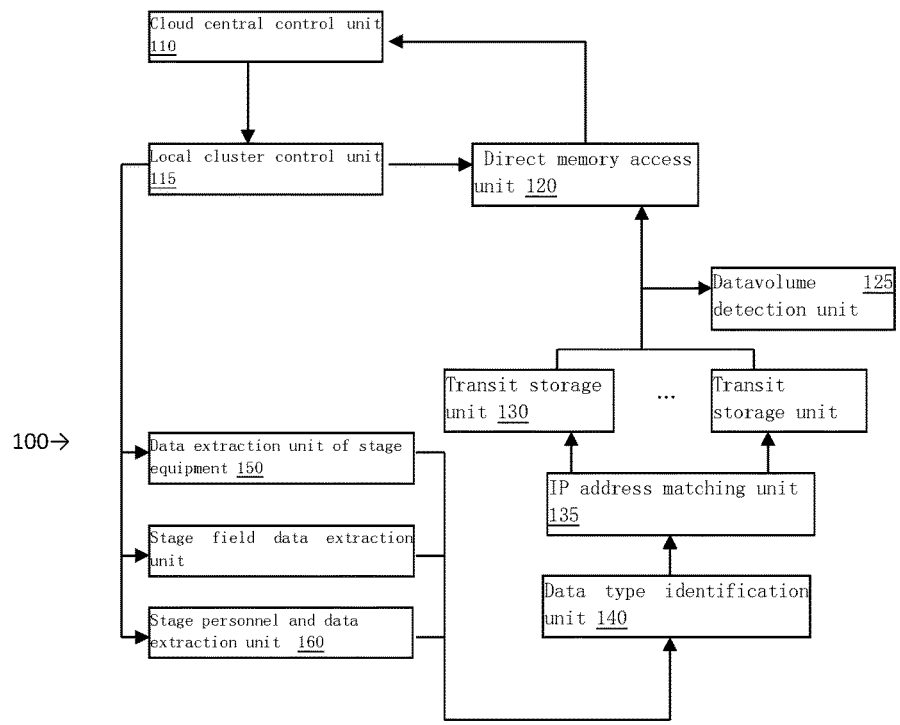
FIG. 1 is a schematic diagram of a multidimensional stage adaptive transmission control system in an embodiment of the invention.

In an embodiment of the invention, a multidimensional stage adaptive transmission control system 100 is provided, as shown in FIG. 1. The system includes a local cluster control unit 115, a direct memory access unit 120, a plurality of transit storage units 130, a data type identification unit 140, an IP address matching unit 135, a stage equipment data extraction unit 150, a stage personnel data extraction unit 160, a stage field data extraction unit 155 and a data volume detection unit 125.

The local cluster control unit is used to receive the data acquisition instructions sent from a cloud central control unit 110 and forward the instructions to the direct memory access unit 120, the stage equipment data extraction unit 150, stage personnel data extraction unit 160, and stage field data extraction unit 155.

The direct memory access unit 120 is used to receive the data transfer instructions from the local cluster control unit 115, read the storage data from a plurality of transit storage units 130 and upload the data to the cloud central control unit 110.

The data type identification unit 140 is used to identity the data type of the received data, for example, whether personnel data or equipment data, etc. The IP address matching unit 135 is used to match the received data with the pre-assigned IPv6 addresses, to identify the exact source of data.

The transit storage units 130 are used to store the data submitted by the stage equipment data extraction unit 150, stage personnel data extraction unit 160 and stage field data extraction unit 155 according to the data type and matched IPv6 address.

The data volume detection unit 125 performs data volume detection on the transmitted data. The stage equipment data extraction unit 155 extracts the real-time operating data related to the stage equipment. The stage personnel data extraction unit 160 extracts the real-time execution data relating to stage performers. The stage field data extraction unit 155 extracts the dynamic data relating to the stage field.

Figure 2:
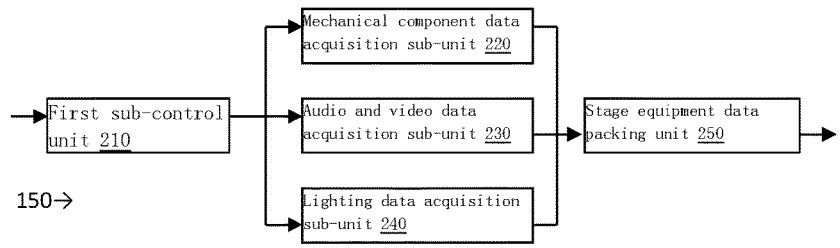
FIG. 2 is a schematic diagram of a stage equipment data extraction unit in an embodiment of the invention.

In an embodiment of the invention, referring to FIG. 2, the stage equipment data extraction unit 150 specifically includes a first sub-control unit 210, a stage equipment data packing unit 250, a mechanical component data acquisition sub-unit 220, an audio and video data acquisition sub-unit 230, and a lighting data acquisition sub-unit 240.

The first sub-control unit 210 receives the data acquisition instruction sent by the local cluster control unit 115 (FIG. 1), and instructs the mechanical component data acquisition sub-unit 220, the audio and video data acquisition sub-unit 230, and the lighting data acquisition sub-unit 240 to acquire corresponding data according to the instruction.

The stage equipment data packing unit 250 packs the corresponding data acquired by the mechanical component data acquisition sub-unit 220, the audio and video data acquisition sub-unit 230, and the lighting data acquisition sub-unit 240 and uploads the data to the transit storage unit.

The mechanical component data acquisition sub-unit 220 periodically acquires the sensing information of the connected mechanical components. The sensing information includes the stage three-dimensional coordinate of the mechanical components and its operating state. The audio and video data acquisition sub-unit 230 acquires the audio and video play message of the stage in a real-time manner.

The lighting data acquisition sub-unit 240 acquires the operating information of the stage lighting in a real-time manner.

In a preferred embodiment of the invention, the mechanical component data acquisition sub-unit 220 may include an angular motion detection unit connected to a vehicle station, which calculates a position and speed of the vehicle station in a real-time manner, and sends the position and speed of the vehicle station to the stage equipment data packing unit as sensing information. A limit sensing unit sends limit alarm information to the stage equipment data packing unit when detecting that the position of the corresponding vehicle station reaches a limit height. A safety rope sensing unit sends rope-release alarm information to the stage equipment data packing unit when detecting that a degree of tightness of the safety rope of the corresponding vehicle station reaches a set threshold value.

The stage equipment data packing unit 250 reports the received limit alarm information or rope-release alarm information to the cloud central control unit through the transit storage unit. The cloud central control unit is further configured to stop the operation of the vehicle station after receiving the limit alarm information or the rope-release alarm information.

In a preferred embodiment of the invention, the audio and video data acquisition sub-unit 230 may include a real-time audio playback parameter acquisition unit, a real-time video playback parameter acquisition unit, an audio and video pre-programmed parameter acquisition unit, and a first parameter comparison unit.

The real-time audio playback parameter acquisition unit and the real-time video playback parameter acquisition unit are used for real-time acquisition of the audio and video parameters played during the stage performance, and the parameters include but are not limited to, tone, cracking voice, height, delay, synchronization and other information. The audio and video pre-programmed parameter acquisition unit is used for acquiring the relevant video and audio parameters to be played during the performance in advance from the cloud central control unit.

The first parameter comparison unit is used for comparing the acquired real-time audio and video parameters with the pre-programmed audio and video parameters acquired in advance. When they are not corresponding, abnormal information of audio and video playing is generated, and these abnormal information and real-time parameters are reported to the cloud central control unit through the transit storage unit 130 (FIG. 1). The cloud central control unit 110 (FIG. 1) is further used for correcting the audio and video playing parameters after receiving the abnormal audio and video playing information and real-time parameters, and sending them to an audio and video playing unit (not shown).

In a preferred embodiment of the invention, the lighting data acquisition sub-unit 240 specifically includes a real-time light parameter acquisition unit, a pre-programmed light parameter acquisition unit, and a second parameter comparison unit. The real-time light parameter acquisition unit is used for acquiring real-time light parameters used during the stage performance, and the parameters include but not limited to luminance, color, synchronization, follow spot position and other information. The pre-programmed light parameter acquisition unit is used for acquiring the relevant light parameters needed during the performance in advance from the cloud central control unit. The second parameter comparison unit is used for comparing acquired real-time light parameters with the pre-programmed light parameters acquired in advance. When they are not corresponding, abnormal light information is generated, and the abnormal light information and real-time light parameters will be reported to the cloud central control unit through the transit storage unit. The cloud central control unit 110 (FIG. 1) is further used for correcting the light parameters after receiving the abnormal light information and real-time parameters, and sending them to each stage lighting unit (not shown).

Figure 3:
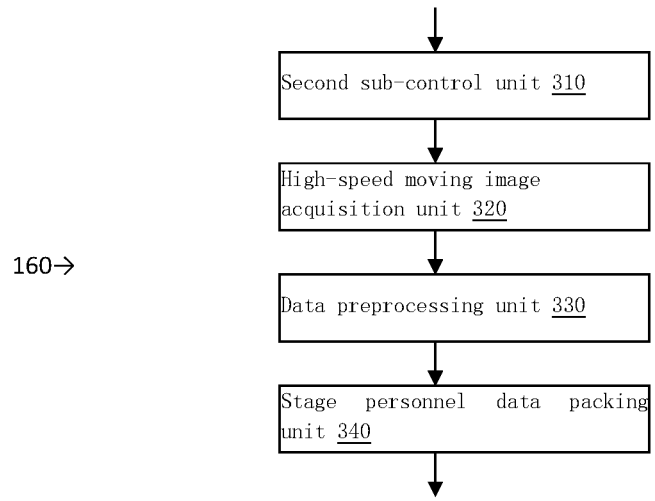
FIG. 3 is a schematic diagram of a stage personnel data extraction unit in an embodiment of the invention.

Referring to FIG. 3, in a preferred embodiment of the invention, the stage personnel data extraction unit 160 specifically includes a second sub-control unit 310, a stage personnel data packing unit 340, a high-speed moving image acquisition unit 320, and a data preprocessing unit 330.

The second sub-control unit 310 is used for receiving the data acquisition instruction sent by the local cluster control unit 115 (FIG. 1), and instructing the high-speed moving image acquisition unit 320 to acquire corresponding data according to the instruction.

The high-speed moving image acquisition unit 320 acquires the body movement state of the performers and recording a video. The data preprocessing unit 330 receives the data acquired by the high-speed moving image acquisition unit 320, extracts the key action frames, and recognizes and compares an action sequence. The stage personnel data packing unit 340 packs the corresponding data of the data preprocessing unit 330 and transmits the data to the transit storage unit 130 (FIG. 1).

In a preferred embodiment of the invention, the data preprocessing unit 330 may include a preprogrammed action acquisition unit, which is used for acquiring the standard action sequence of the performers needed during the performance from the cloud central control unit. An action sequence recognition unit, angles the body motion state data acquired by the high-speed moving image acquisition unit 320 and extracts the key action frames. An action compilation unit, compiles actions of the performers using the key action frames extracted by the action sequence recognition unit. An action comparison unit compares the programmed action with the standard action sequence acquired by the pre-programmed action acquisition unit, and reports the corresponding key action frame and comparison result to the cloud central control unit 110 (FIG. 1) through the transit storage unit 130 (FIG. 1) when the comparison is not successful. The cloud central control unit 110 (FIG. 1) is further used for storing the key action frames after receiving the comparison result for follow-up improvement and learning.

Figure 4:
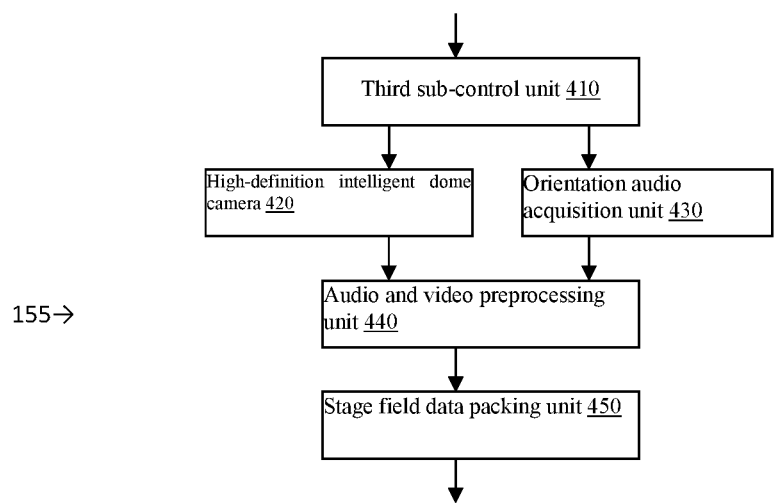
FIG. 4 is a schematic diagram of a stage field data extraction unit in an embodiment of the invention.

Referring to FIG. 4, in a preferred embodiment of the invention, the stage field data extraction unit 155 includes a third sub-control unit 410, a stage field data packing unit 450, a plurality of high-definition intelligent dome cameras 420, a plurality of orientation audio acquisition units 430, and an audio and video pre-processing unit 440.

The third sub-control unit 410 receives the data acquisition instruction sent by the local cluster control unit 115 (FIG. 1), and instructs one or more of the plurality of high-definition intelligent dome cameras to acquire corresponding data according to the instruction. The high-definition intelligent dome cameras 320 acquire the real-time images of the performance site, and acquire relevant information including audience flow and crowd density, etc. The orientation audio acquisition units 330 acquire background noises of the performance site, and acquire other relevant information including noise intensity, noise location, etc.

The audio and video pre-processing unit 440 compresses encoding of the acquired audio and video data. The stage field data packing unit 450 packs the audio and video data after compressed encoding by the audio and video pre-processing unit 440 and uploads the data to the transit storage unit 130 (FIG. 1).

In a preferred embodiment of the invention, the direct memory access unit 120 (FIG. 1) includes a buffering relay unit, a finite high-speed storage collection and an interface control sequence unit. The buffering relay unit includes a first first-in first-out (FIFO) buffer and a second FIFO buffer. The first FIFO buffer is used to buffer the data read from the transit storage unit 130 (FIG. 1) to the cloud central control unit 110 (FIG. 1), and the second FIFO buffer is used to buffer data written from each data extraction unit 140 (FIG. 1) to the transit storage unit 130 (FIG. 1). When data stream communication occurs between transit storage units 130 (FIG. 1), the first FIFIO buffer or the second FIFI buffer may be used.

The finite high-speed storage collection includes two sets of configuration registers and a set of state register. The two sets of configuration registers are used to control each data stream communication of the transit storage unit in turn. Each set of configuration register is at least used to configure the type of data stream channel in each data stream communication, the type of data extraction unit, the sending address or/and receiving address of the transit storage unit 130 (FIG. 1), and the transmission data length. The set of state register is used to start the transit storage unit and reflect the transmission state of the transit storage unit 130 (FIG. 1). The transmission state at least reflects if the transmission is completed.

The interface control sequence unit includes a state recognizer. When the transit storage unit 130 (FIG. 1) has access to the data extraction unit, the state recognizer directly controls the interface signal receiving or transmitting data of the data extraction unit according to the states and state transitions, and detects the working condition of the data extraction unit in a real-time manner.

Figure 5:
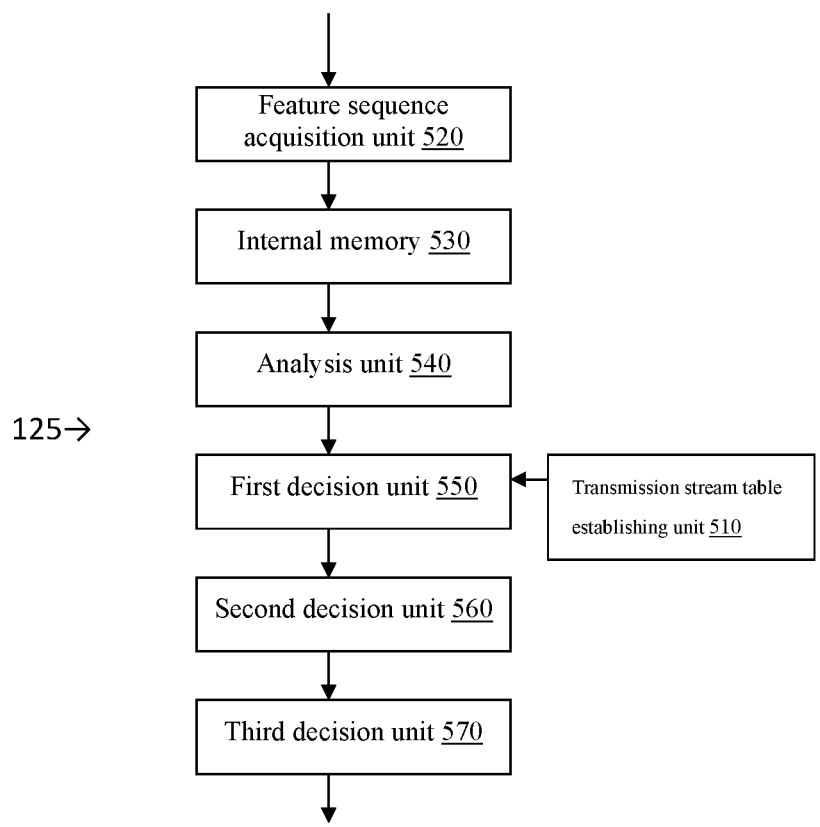
FIG. 5 is a schematic diagram of a data volume detection unit in an embodiment of the invention.

Referring to FIG. 5, in a preferred embodiment of the invention, the data volume detection unit 125 includes a transmission stream table establishing unit 510, a feature sequence acquisition unit 510, an internal memory 530, an analysis unit 540, a first decision unit 550, a second decision unit 560 and a third decision unit 570.

The transmission stream table establishing unit 510 is used for establishing a transmission stream table, of which the structure attributes include: type of transmission node, protocol type, source IP, source port, destination IP, destination port, direction of data packet, and datagram length. The feature sequence acquisition unit 520 acquires the feature sequence of various monitored transmission streams in the transport layer, and stores them in the internal memory 530. The analysis unit 540 analyzes the intercepted data packet header to acquire the data packet header protocol type, source IP, source port, destination IP, destination port and datagram length.

The first decision unit 550 inquires if the source IP, source port, destination IP and destination port recorded in the transmission stream are the same as those of the data packet under the same protocol type in the transmission stream table. The second decision unit 560 decides if the type of the transmission node of the transmission stream has been calibrated when the first decision unit 550 decides a same storage situation. If the type of the transmission node of the transmission stream has not been calibrated the second decision unit 560 records the direction of the data packet and datagram length in the transmission stream and loads them in the transmission stream table.

The third decision unit 570 decides if the data packet record of the network data stream has reached a set threshold value of number of data packet N. If the threshold value N is reached, indicating the feature sequence of the transmission stream has been collected, then the third decision unit 570 makes a record of the data transmission quantity in the stage.

Figure 6:
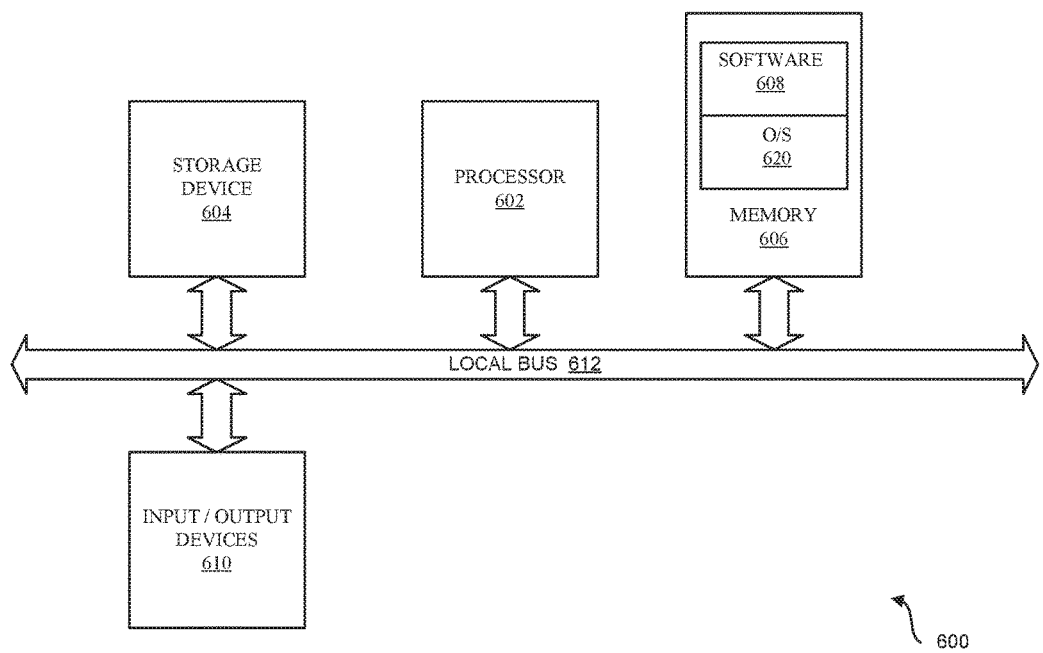
FIG. 6 is a schematic diagram illustrating an example of a system for executing functionality of the present invention.

The present system for executing the functionality described in detail above may be a computer, an example of which is shown in the schematic diagram of FIG. 6. The system 600 contains a processor 602, a storage device 604, a memory 606 having software 608 stored therein that defines the abovementioned functionality, input and output (I/O) devices 610 (or peripherals), and a local bus, or local interface 612 allowing for communication within the system 600. The local interface 612 can be, for example but not limited to, one or more buses or other wired or wireless connections, as is known in the art. The local interface 612 may have additional elements, which are omitted for simplicity, such as controllers, buffers (caches), drivers, repeaters, and receivers, to enable communications. Further, the local interface 612 may include address, control, and/or data connections to enable appropriate communications among the aforementioned components.

The processor 602 is a hardware device for executing software, particularly that stored in the memory 606. The processor 602 can be any custom made or commercially available single core or multi-core processor, a central processing unit (CPU), an auxiliary processor among several processors associated with the present system 600, a semiconductor based microprocessor (in the form of a microchip or chip set), a macroprocessor, or generally any device for executing software instructions.

The memory 606 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 606 may incorporate electronic, magnetic, optical, and/or other types of storage media. Note that the memory 606 can have a distributed architecture, where various components are situated remotely from one another, but can be accessed by the processor 602.

The software 608 defines functionality performed by the system 600, in accordance with the present invention. The software 608 in the memory 606 may include one or more separate programs, each of which contains an ordered listing of executable instructions for implementing logical functions of the system 600, as described below. The memory 606 may contain an operating system (0/S) 620. The operating system essentially controls the execution of programs within the system 600 and provides scheduling, input-output control, file and data management, memory management, and communication control and related services.

The I/O devices 610 may include input devices, for example but not limited to, a keyboard, mouse, scanner, microphone, etc. Furthermore, the I/O devices 610 may also include output devices, for example but not limited to, a printer, display, etc. Finally, the I/O devices 610 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 600 is in operation, the processor 602 is configured to execute the software 608 stored within the memory 606, to communicate data to and from the memory 606, and to generally control operations of the system 600 pursuant to the software 608, as explained above.

It should be noted that in various implementations, each of the above identified units and sub-units, for example, the local cluster control unit 115, the direct memory access unit 120, the plurality of transit storage units 130, the data type identification unit 140, the IP address matching unit 135, the stage equipment data extraction unit 150, the stage personnel data extraction unit 160, the a stage field data extraction unit 155, and the data volume detection unit 125, may include an individual processor and memory for storing instructions for execution by the processor, or the units and sub-units may access one or more common processors and memories.

The above embodiments do not describe all details nor limit the patent application. Apparently, many modifications and variations can be made according to the above descriptions. These embodiments in the patent application are to explain the principle and actual application of the patent application, so that the person skilled in the art can make good use of the patent application or modify to use them. The patent application is limited only by the claims and their full scope and equivalents.

What is claimed is:

1. A multidimensional stage adaptive transmission control system, comprising:
    a local cluster control unit,
    a direct memory access unit,
    a plurality of transit storage units,
    a data type identification unit,
    an IP address matching unit,
    a stage equipment data extraction unit,
    a stage personnel data extraction unit,
    a stage field data extraction unit, and
    a data volume detection unit,
    wherein the local cluster control unit is used to receive the data acquisition instructions sent from the cloud central control unit and forward the instructions to the direct memory access unit, stage equipment data extraction unit, stage personnel data extraction unit and stage field data extraction unit;
    the direct memory access unit is used to receive the data transfer instructions from the local cluster control unit, read the storage data from a plurality of transit storage units and upload the data to the cloud central control unit;
    the data type identification unit is used to identity the data type of the received data;
    the IP address matching unit is used to match the received data with the pre-assigned IPv6 addresses, to identity the exact source of data; and
    the transit storage unit is used to store the data submitted by the stage equipment data extraction unit, stage personnel data and stage field data extraction unit according to the data type and matched IPv6 address;
    the data volume detection unit is used to perform data volume detection on the transmitted data;
    the stage equipment data extraction unit is used to extract real-time operating data related to the stage equipments;
    the stage personnel data extraction unit is used to extract the real-time execution data relating to stage performers, and
    the stage field data extraction unit is used to extract the dynamic data relating to the stage field;
    wherein the direct memory access unit comprises a buffering relay unit, a finite high-speed storage collection and an interface control sequence unit;
    the buffering relay unit comprises a first first-in first-out buffer and a second first-in first-out buffer, wherein the first first-in first-out buffer is used to buffer the data read from the transit storage unit to the cloud central control unit, and the second first-in first-out buffer is used to buffer data written from each data extraction unit to the transit storage unit; when data stream communication occurs between transit storage units, the first first-in first-out buffer or the second first-in first-out buffer is used;
    the finite high-speed storage collection comprises two sets of configuration registers and a set of state register, the two sets of configuration registers are used to control each data stream communication of the transit storage unit in turn, wherein each set of configuration register is at least used to configure the type of data stream channel in each data stream communication, the type of data extraction unit, the sending address or/and receiving address of the transit storage unit, and the transmission data length; and the set of state register is used to start the transit storage unit and reflect the transmission state of the transit storage unit; the transmission state at least reflects if the transmission is completed;
    the interface control sequence unit comprises a state recognizer; when the transit storage unit has access to the data extraction unit, the state recognizer directly controls the interface signal of receiving or transmitting data of the data extraction unit according to the states and state transitions, and detecting the working condition of the data extraction unit in a real-time manner.

2. The system according to claim 1, the stage equipment data extraction unit specifically comprises a first sub-control unit, a stage equipment data packing unit, a mechanical component data acquisition sub-unit, an audio and video data acquisition sub-unit and a lighting data acquisition sub-unit; wherein,
    the first sub-control unit is used to receive the data acquisition instructions sent from the local cluster control unit, and instruct the mechanical component data acquisition sub-unit, the audio and video data acquisition sub-unit and the lighting data acquisition sub-unit to acquire corresponding data according to the instructions;
    the stage equipment data packing unit is used to pack the corresponding data acquired from the mechanical component data acquisition sub-unit, audio and video data acquisition sub-unit, and lighting data acquisition sub-unit and transmit the corresponding data to the transit storage unit;
    the mechanical component data acquisition sub-unit is used to periodically acquire sensing information of mechanical components which are connected to the mechanical component data acquisition sub-unit, and the sensing information comprises three-dimensional coordinates of the stage and an operating state of the mechanical components;
    the audio and video data acquisition subunit is used to acquire an audio and video play message of the stage in a real-time manner; and
    the lighting data acquisition sub-unit is used to acquire a stage lighting operating information in a real-time manner.

3. The system according to claim 2, wherein the mechanical component data acquisition sub-unit specifically comprises:
- an angular motion detection unit connected to a vehicle station, used for calculating a position and speed of the vehicle station in a real-time manner, and sending the position and speed of the vehicle station to the stage equipment data packing unit as sensing information;
- a limit sensing unit, which is used for sending limit alarm information to the stage equipment data packing unit when detecting that the position of the corresponding vehicle station reaches a limit height; and
- a safety rope sensing unit, which is used for sending rope-release alarm information to the stage equipment data packing unit when detecting that the degree of tightness of the safety rope of the corresponding vehicle station reaches a set threshold value;
- wherein the stage equipment data packing unit reports the received limit alarm information or rope-release alarm information to the cloud central control unit through the transit storage unit; and
- the cloud central control unit is further used for stopping an operation of the vehicle station after receiving the limit alarm information or the rope-release alarm information.

4. The system according to claim 3, wherein the audio and video data acquisition subunit specifically comprises a real-time audio playback parameter acquisition unit, a real-time video playback parameter acquisition unit, an audio and video pre-programmed parameter acquisition unit and a first parameter comparison unit;
- the real-time audio playback parameter acquisition unit and the real-time video playback parameter acquisition unit are used for real-time acquisition of audio and video parameters played during a stage performance;
- the audio and video preprogrammed parameter acquisition unit is used for acquiring a relevant video and audio parameters to be played during the performance in advance from the cloud central control unit;
- the first parameter comparison unit is used for comparing the acquired real-time audio and video parameters with the preprogrammed audio and video parameters acquired in advance, when they are not corresponding, abnormal information of audio and video playing is generated, and the abnormal information and real-time parameters of audio and video playing will be reported to the cloud central control unit through the transit storage unit; and
- the cloud central control unit is further used for correcting the audio and video playing parameters after receiving the abnormal information and real-time parameters, and sending them to the audio and video playing unit.

5. The system according to claim 4, wherein the lighting data acquisition sub-unit specifically comprises a real-time light parameter acquisition unit, a pre-programmed light parameter acquisition unit, and a second parameter comparison unit, wherein,
- the real-time light parameter acquisition unit is used for acquiring real-time light parameters used during the stage performance;
- the preprogrammed light parameter acquisition unit is used for acquiring the relevant light parameters required during the performance in advance from the cloud central control unit;
- the second parameter comparison unit is used for comparing acquired real-time light parameters with the preprogrammed light parameters acquired in advance, when they are not corresponding, abnormal light information is generated, and the abnormal information and real-time parameters will be reported to the cloud central control unit through the transit storage unit;
- the cloud central control unit is further used for correcting the light parameters after receiving the abnormal information and real-time parameters, and sending them to each stage lighting unit.

6. The system according to claim 5, wherein the stage personnel data extraction unit specifically comprises a second control subunit, a stage personnel data packing unit, a high-speed moving image acquisition unit, and a data preprocessing unit;
- wherein the second control subunit is used for receiving the data acquisition instruction sent by the local cluster control unit, and instructing the high-speed moving image acquisition unit to acquire corresponding data according to the instruction;
- the high-speed moving image acquisition unit is used for acquiring the body movement state of at least one performer and recording a video;
- the data preprocessing unit is used for receiving the data acquired by the high-speed moving image acquisition unit, extracting at least one key action frame, and recognizing and comparing the action sequence;
- the stage personnel data packing unit is used for packing the corresponding data of the data preprocessing unit and transferring the corresponding data to the transit storage unit.

7. The system according to claim 1, wherein the data volume detection unit comprises a transmission stream table establishing unit, a feature sequence acquisition unit, an internal memory, an analysis unit, a first decision unit, a second decision unit and a third decision unit;
- wherein the transmission stream table establishing unit is used for establishing a transmission stream table, structure attributes of the transmission stream table comprising: type of transmission node, protocol type, source IP, source port, destination IP, destination port, direction of data packet, and datagram length;
- the feature sequence acquisition unit is used for acquiring the feature sequence of various monitored transmission streams in the transport layer, and storing the feature sequence of various monitored transmission streams in the internal memory;
- the analysis unit is used for analyzing the intercepted data packet header, to acquire protocol type, source IP, source port, destination IP, destination port and datagram length of the intercepted data packet;
- the first decision unit is used for inquiring if the source IP, source port, destination IP and destination port recorded in the transmission stream are the same as the source IP, source port, destination IP and destination port of the data packet under the same protocol type in the transmission stream table;
- the second decision unit is used for deciding if the type of the transmission node of the transmission stream has been calibrated when the first decision unit decides a same storage situation, if not, then recording the direction of the data packet and datagram length in the transmission stream and loading them in the transmission stream table;
- the third decision unit is used for deciding if the data packet record of the network data stream reaches the set threshold value of number of data packet N, if reaching the threshold value N, which shows the feature sequence of the transmission stream has been collected, then make a record of the data transmission quantity in the stage.

* * * * *